United States Patent [19]
Sano et al.

[11] 3,767,889
[45] Oct. 23, 1973

[54] METHOD OF MAKING INTERCELL CONNECTIONS IN STORAGE BATTERY

[75] Inventors: Ichiro Sano, Kanagawa; Testuo Sakurai, Fujisawa, both of Japan

[73] Assignee: Matsushita Electric Industrial Co. Ltd., Osaka, Japan

[22] Filed: Feb. 14, 1972

[21] Appl. No.: 226,038

[30] Foreign Application Priority Data
  Feb. 17, 1971  Japan .................................. 46/7526
  Feb. 17, 1971  Japan .................................. 46/7257
  May 26, 1971  Japan ................................ 46/36540

[52] U.S. Cl. ............... 219/137, 136/134 R, 219/157
[51] Int. Cl. ........................... B23k 9/16, B23k 9/24
[58] Field of Search ............................... 136/134 R; 219/121 P, 137, 152, 157

[56] References Cited
UNITED STATES PATENTS
3,336,164  8/1967  Miller ............................ 136/134 R
2,862,099  11/1958  Gage ................................ 219/121 P
2,960,594  11/1960  Thorpe ........................ 219/121 P X
3,313,658  4/1967  Sabatino et al. ............ 136/134 R X
3,526,746  9/1970  Campbell ........................ 219/157 X FOREIGN PATENTS OR APPLICATIONS
869,763  6/1961  Great Britain ................. 136/134 R Primary Examiner—R. F. Staubly
Attorney—Richard K. Stevens et al.

[57] ABSTRACT

A method of making an intercell connection in a storage battery comprising connecting a pair of connectors to two cell element assemblies respectively on opposite sides of a battery partition wall, providing a connecting projection of one of the connectors so that it extends through an opening in the partition wall into an aperture in the other connector, pressing these two connectors against the partition wall, and welding the connecting projection to the inner wall of the aperture in the other connector by carrying out inert gas shielded arc welding on one side of the partition wall.

7 Claims, 9 Drawing Figures

METHOD OF MAKING INTERCELL CONNECTIONS IN STORAGE BATTERY

This invention relates to a method of making intercell connections which extend through an opening in a battery partition wall partitioning the battery casing into a plurality of cell compartments for electrically connecting the adjacent cell element assemblies with each other.

Methods of making a connection between adjacent cell element assemblies on opposite sides of a partition wall by means of a connector extending through an opening in the partition wall, that is, methods of making an intercell connection through a partition wall have been proposed only recently, and some of these methods have already been put into practice.

U.S. Pat. Nos. 3,313,658 and 3,476,611 owned by Globe-Union Incorporated in the United States of America are typical examples of the methods of making an intercell connection between adjacent cell element assemblies. According to U.S. Pat. No. 3,313,658 above described, a connector is formed integrally with a strap connected to each of adjacent cell element assemblies on opposite sides of a partition wall in a storage battery, and a pair of pressure applying means or jaws are used to force these connectors horizontally toward the partition wall thereby bringing a portion of one of the connectors into engagement with a corresponding portion of the other connector in an opening bored in the partition wall. Then, a welding current is supplied using these pressure applying jaws as electrodes thereby generating Joule heat in the connector portions engaging with each other in the opening of the partition wall. Thus, the connector portions are deformed due to the application of pressure and heat thereto and the fluidized material fills the opening to provide an electrical connection between the connectors.

U.S. Pat. No. 3,476,611 is generally similar to U.S. Pat. No. 3,313,658 above described. In U.S. Pat. No. 3,476,611, a pair of opposite connectors are not initially brought into contact with each other, and means such as a connecting pin having a reduced cross sectional portion is disposed in through openings in the connectors so that Joule heat can be readily produced in the reduced cross sectional portion when a current flows through the pin. In this case too, pressure is similarly applied to the connectors and heat is produced in the reduced cross sectional pin portion due to the supply of a current therethrough for providing an electrical connection between the connectors.

These two patents are generally the same in that the connectors or the connectors and the pin are connected with each other mechanically as well as electrically, and electrical heating and application of pressure are utilized to establish an intercell connection. Due to the fact that the metal is molten or softened within the opening in the partition wall when subjected to heat, the partition wall or the inner wall of the opening in the partition wall must be sufficiently resistant to heat, and the pressure applying means must have sufficient resistance to heat and oxidation so that they may be substantially free from thermal deterioration and undesirable reductions in the electrical conductivity over an extended period of time. Another method of making such an intercell connection has been proposed according to which the intercell connection is provided by caulking under pressure. This method, however, has not been suitable for application to small-sized storage batteries due to the difficulty of insertion of the caulking tool into the cell element compartment.

It is therefore an object of the present invention to provide a novel and improved method of making an intercell connection within a very short length of time by carrying out inert gas shielded arc welding on one side of a battery partition wall without connecting the connectors of adjacent cell element assemblies within an opening bored in the partition wall.

Another object of the present invention is to provide a method of making an intercell connection in which heat at an extremely high temperature is concentrated on a limited portion thereby minimizing the influence of heat on the remaining portions.

In the present invention, the connectors integral with conductive straps of adjacent cell element assemblies are not connected with each other in an opening of a partition wall, but they are connected and secured to each other on one side of the partition wall. To this end, one of the two connectors to be connected with each other are provided with a columnar projection extending through the opening of the partition wall. The diameter of the projection is smaller than the diameter of the opening so that the projection can be easily inserted into the opening, and the length of the projection is such that the projection extends suitably through the opening in the partition wall into an aperture in the other connector which engages the rear face of the partition wall. Further, each connector has a transverse width which is larger than the diameter of the opening in the partition wall. Thus, the connectors cover completely the opening in the partition wall on opposite sides thereof when they are disposed along the opposite faces of the partition wall with the columnar projection on one of the connectors extending through the opening in the partition wall. The connector provided with the columnar projection and the connector provided with the aperture for receiving the columnar projection therein are formed integrally with and extend from one end of conductive straps connected to conventional cell element assemblies.

The intercell connection between the two cell element assemblies disposed on opposite sides of the partition wall can be provided by bringing the connector, which is connected to one of the cell element assemblies and is formed with the columnar projection on the face opposite to the partition wall, into engagement with one face of the partition wall while inserting the projection into the opening in the partition wall, bringing the other connector, which is provided with the aperture for receiving the projection therein, into engagement with the other face of the partition wall, pressing these connectors against the partition wall by a pair of pressure applying means, and heating the end portion of the projection by a torch to fluidize the end portion of the projection.

The heating torch used for fluidizing the end portion of the projection may be one used generally in the so-called inert gas shielded arc welding in which the welding arc is shielded by an envelope of an inert gas for the purpose of preventing oxidation of the weld. More particularly, welding called the "plasma welding" is most preferred for attaining the intercell connection according to the present invention.

Now, the plasma welding will be briefly described. As a matter such as a metal is heated to high temperatures, its state changes from solid    liquid    gas and the gas molecules are broken into atoms at a further higher temperature. At a temperature of the order of 10,000 °K, ionization of the atoms into positive ions and free electrons takes place. The ensemble of these positive ions and free electrons is termed as a plasma which has electrically conducting properties and shows mutual interference with electric and magnetic fields. The "plasma welding" referred to above utilizes this principle. According to this plasma welding, an arc is produced in an atmosphere of inert gas flowing at a high velocity and a plasma thus obtained is utilized to produce a high temperature. This plasma welding is advantageous in that the arc can be closely focused by the external stream of inert gas, and due to the plasma produced in the manner above described, the end portion of the columnar projection on one of the connectors provided for the intercell connection can be fluidized within a very short length of time by the concentrated spot of the arc directed to the end portion of the projection. Another advantage of the plasma welding resides in the fact that the current value and duration of current supply can be reduced compared with those required in any other kinds of electric welding and the welding can be carried out with less power consumption. A further advantage of the plasma welding resides in the fact that the welding can be satisfactorily carried out without being substantially affected by the surface state or contamination of welded portions and a satisfactory weld can be obtained even when an oxide or any other film is formed on the welded portions.

Other objects, features and advantages of the present invention will be apparent from the preferred embodiments thereof taken in conjunction with the accompanying drawings, in which.

Figure 1:
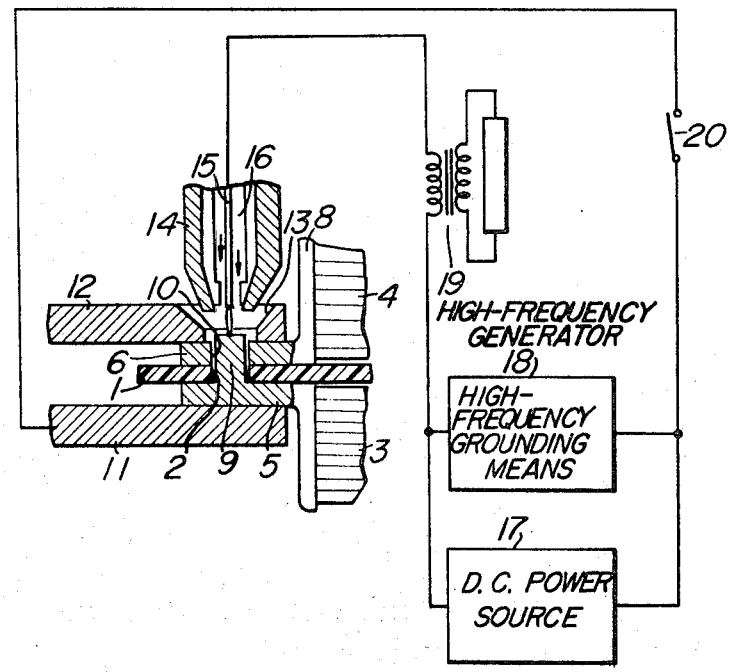
FIG. 1 is a sectional view of a portion of a storage battery showing the relationship between the intercell connecting elements prior to completion of the intercell connection.

For convenience, only a portion of a storage battery is illustrated in the drawings and it will be appreciated that the remainder of the battery construction can be of conventional construction. Referring now to FIG. 1, partition walls 1 are provided as an integral part of a battery casing (not shown) made of a synthetic resin such as polypropylene, acrylonitrile butadiene styrene (A.B.S.), acrylonitrile styrene (A.S.) or ebonite so as to partition the casing into a plurality of cell element compartments. Each of the partition walls 1 is formed with an opening 2 through which an intercell connection can be made by the through par-tition method. Preassembled cell element assemblies 3 and 4 are arranged in the compartments on opposite sides of the partition wall 1 and each assembly includes a conductive strap 7 and 8. As is well known in the art, one of the conductive straps, for example 7, is connected to the positive plates of the assembly 3 and the other strap 8 is connected to the negative plates of the assembly 4 thereby connecting the assemblies 3 and 4 electrically and mechanically.

The strap 7 connected to the positive plates of the cell element assembly 3 is provided with a connector 5 of short length which extends normal to the strap 7. The strap 8 connected to the negative plates of the cell assembly 4 is provided with a connector 6 of short length which extends normal to the strap 8. The connectors 5 and 6 are cast integrally with the respective straps 7 and 8 and are preferably by a lead alloy. These connectors 5 and 6 can be positioned along opposite faces of the partition wall 1. The connector 5 is provided with a columnar projection 9 on the face opposite to the partition wall 1, and this projection 9 extends loosely through the opening 2 in the partition wall 1 into an aperture 10 bored in the other connector 6 with its end protruding slightly from the rear face of the connector 6. The cell element assemblies thus assembled are installed in the cell element compartments of the battery casing, and then the battery casing is erected in its upright position.

A pair of pressure applying means 11 and 12 are provided for pressing the connectors 5 and 6 against the partition wall 1 and are preferably of steel or like material having a sufficient mechanical strength. One of the pressure applying means 12, applying pressure to the connector 6 having the aperture 10, is provided with a tapered aperture 13 which registers with the aperture 10 and has a diameter larger than that of the aperture 10 for facilitating the insertion of a torch which will be described later. As described previously, the connectors 5 and 6 have a transverse width larger than the diameter of the opening 2 in the partition wall 1 so that, when brought into intimate contact with the partition wall 1, they can completely cover the opening 2.

Figure 2:
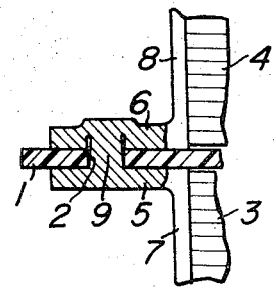
FIG. 2 is a sectional view illustrating a portion of the embodiment of FIG. 1 after the intercell connection has been completed.

FIG. 1 shows the state in which the connectors 5 and 6 are pressed against the partition wall 1 by the pressure applying means 11 and 12 and the columnar projection 9 of the connector 5 extends through the opening 2 of the partition wall 1 into the aperture 10 of the connector 6. A welding torch 14 is disposed opposite the end of the projection 9 and applies heat to the end portion of the projection 9 to fluidize such end portion within a very short length of time thereby completing an intercell connection as shown in FIG. 2. The torch 14 comprises a central electrode 15 of tungsten which is sufficiently resistant to heat and wear, and an annular gas passage 16 surrounding the central electrode 15 for supplying an inert gas such as argon therethrough. The end portion of the body of the torch 14 is constricted relative to the remaining body portion thereby forming a slit so as to prevent the arc from spreading and sufficiently enclose the arc within the envelope of the inert gas.

An electrical circuit for producing the arc includes a d.c. power source 17 which has a drooping characteristic such that its d.c. voltage under load is, for example, 30 volts as compared with a no-load voltage of 300 volts, a high-frequency grounding means 18, a high-frequency generator 19 of the series spark-gap oscillator type which generates a high frequency voltage of 3,000 volts at a frequency of about 3 megahertz, and an on-off control switch 20. The electrical connection in the circuit is such that the central electrode 15 of the torch 14 is, for example, negative and the pressure applying means 11 associated with the connector 5 having the projection 9 formed integrally therewith is positive.

In the state shown in FIG. 1, an inert gas such as argon is supplied from an external gas source (not shown) to the gas passage 16 in the torch 14 so that the inert gas flows at a high velocity in a direction shown by the arrow. The switch 20 is then turned on to apply a voltage across the tungsten electrode 15 and the connector 5 which is applied with a force of about 300 kilograms by the pressure applying means 11 which acts also as a grounded terminal. A spark is emitted from the tip of the tungsten electrode 15 toward the end of the columnar projection 9 of the connector 5 for a very short length of time, for example, 0.06 to 0.3 second. The arc thus produced is concentrated by the external stream of the inert gas and its temperature is increased abruptly so that it turns into a plasmatic arc. Due to the focusing of the plasmatic arc on the end portion of the projection 9, such end portion is instantaneously fluidized to fill the aperture 10 in the other connector 6 thereby providing a firm connection between the connectors 5 and 6. The force applied to the pressure applying means 11 and 12 which press the connectors 5 and 6 against the partition wall 1 may have a magnitude such that it can bring these two connectors 5 and 6 into intimate contact with the partition wall 1. Practically, a force of 100 to 600 kilograms was found suitable for this purpose. Due to the application of such a large force and intensive heat, the connectors 5 and 6 in sealing engagement with the partition wall 1 while completely covering the opening 2 in the partition wall 1 are welded together while sealing this opening 2 gastight as seen in FIG. 2. The duration of application of heat is very short, and thus, the pressure applying means 11 and 12 are not substantially affected by the heat.

Figure 3:
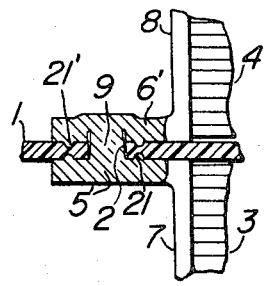
FIG. 3 is a view similar to FIG. 2 but showing a modification of the intercell connection.

A modification shown in FIG. 3 provides a more gastight and liquid-tight joint. Referring to FIG. 3, connectors 5' and 6', which are formed integrally with the straps 7 and 8 cast to the cell element assemblies 3 and 4 on opposite sides of the partition wall 1, are provided with annular projections 21 and 21' respectively on the face opposite to the partition wall 1. The inner diameter of these projections 21 and 21' is larger than the diameter of the opening 2 in the partition wall 1, so that these projections 21 and 21' can be forced into the body portion of the partition wall 1 around the opening 2 when the connectors 5 and 6' are urged against the partition wall 1 by the force of the pressure applying means. A very satisfactory intercell connection can be obtained thereby ensuring freedom from trouble such as shortcircuit due to leakage of the electrolyte. The annular projection may be provided on only one of the connectors.

An important feature of the embodiments of the present invention resides in the fact that one of two connectors to be connected with each other is provided with an integral columnar projection which extends through an opening in the partition wall into an aperture in the other connector and that these two connectors are pressed against the partition wall to cover completely the opening in the partition wall. The provision of the columnar projection on one of the connectors so as to make an intercall connection by fluidizing the end portion of this projection and the employment of plasma welding are advantageous in that the opening and the adjacent portion of the partition wall are not adversely affected by the heat produced during welding. The present invention differs from the intercell connection provided by U.S. Pat. Nos. 3,313,658 and 3,476,611 of Globe-Union Incorporated in this respect. Further, the present invention differs from said patents in that the connectors are pressed against the partition wall to completely cover the opening in the partition wall and impart a stress to the portion of the partition wall adjacent the opening.

Figure 4:
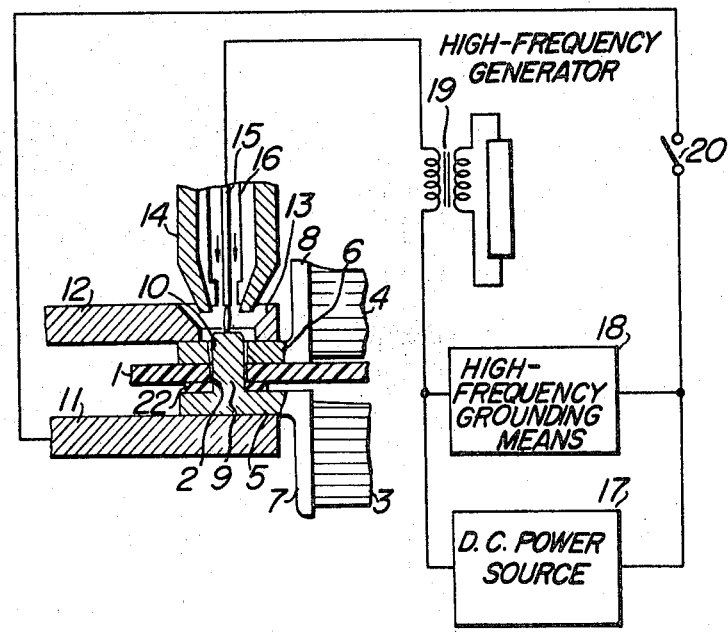
FIG. 4 is a sectional view similar to FIG. 1 but showing another ambodiment of the present invention in which a sealing packing is interposed between the partition wall and one of the intercell connecting elements.
Figure 5:
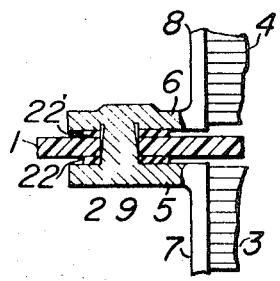
FIG. 5 is a view similar to a portion of the embodiment of FIG. 4 but showing a modification in which the intercell connection has been completed by disposing such sealing packings on opposite sides of the partition wall.

FIG. 4 shows another embodiment of the present invention and like reference numerals are used therein to denote like parts appearing in FIG. 1. FIG. 5 is a modification of the embodiment shown in FIG. 4. In FIGS. 4 and 5, a sealing packing or sealing packings are interposed between the intercell connecting elements or more strictly between one of the connectors and the partition wall or between the two connectors and the partition wall in making an intercell connection.

Referring to FIG. 4, a sealing packing 22 is fitted to a columnar projection 9 formed integrally with one of the connectors 5. This sealing packing 22 is annular in shape and is made of rubber of synthetic resin packing material which is soft and pliable. This packing 22 makes sealing engagement with the portion of the partition wall 1 around an opening 2 when the connector 5 is pressed against the partition wall 1 by a pressure applying means 11. In making the intercell connection including the packing 22 therein, a force of about 100 kilograms is applied to a pair of pressure applying means 11 and 12 thereby pressing the connectors 5 and 6 against the partition wall 1 as shown in FIG. 4, and while maintaining the packing 22 in compression by the force, a torch 14 of the kind described is used to heat and fluidize the end portion of the projection 9.

In the modification shown in FIG. 5, two sealing packings 22 and 22' are interposed between the partition wall 1 and the connectors 5 and 6. In FIG. 5, the first packing 22 is fitted previously on the columnar projection 9 formed integrally with connector 5, and the projection 9 having the packing 22 mounted thereon is inserted into the opening 2 in the partition wall 1. After fitting the second packing 22' on the portion of the projection 9 protruding from the opening 2 in the partition wall 1, the projection 9 is inserted into the aperture in the other connector 6. A force less than 100 kilograms described previously, that is, a force of, for example, 80 to 90 kilograms is then applied to the pressure applying means and plasma welding is applied for fluidizing the end portion of the projection 9 instantaneously. The two sealing packings 22 and 22' are compressed by the vertical force applied to the connectors 5 and 6 by the pair of pressure applying means and are fixed between the partition wall 1 and the connectors 5 and 6 in the compressed state, thereby maintaining a gas-tight and liquid-tight relationship between the intercell connecting elements.

The instantaneous application of heat by the torch may be such as to fluidize not only the end portion of the columnar projection on one of the connectors but also the inner wall portion of the aperture of the other connector so that a satisfactory weld may be produced at the connector portions opposite to the torch. More precisely, if the heat applied by the torch could fluidize substantially the half of the portion of the columnar projection extending through the opening in the partition wall, a more reliable intercell connection ensuring good electrical conduction can be obtained.

A further embodiment of the present invention and a modification thereof shown in FIGS. 6 to 9 are based on the above consideration. In FIGS. 6 to 9, one of the connectors, that is, the connector having an aperture for receiving therein a projection of the other connector is formed on one face thereof with a convex and concave portion consisting of a plurality of alternate convexities and concavities of small width around the aperture so that the convexities among these convexities and concavities can be fluidized together with the end portion of the projection when a plasmatic arc is produced by a welding torch of the kind described.

Figure 6:
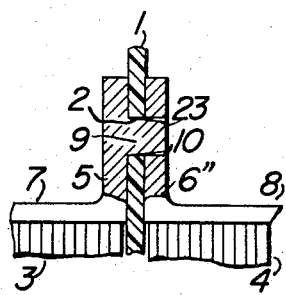
FIG. 6 is a sectional view of a further embodiment of the present invention illustrating the relationship between the intercell connecting elements prior to completion of the intercell connection.
Figure 7:
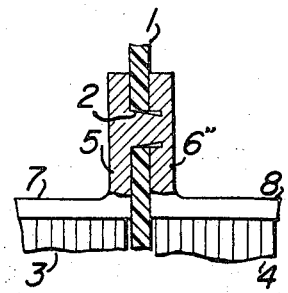
FIG. 7 is a sectional view illustrating the embodiment of FIG. 6 after the intercell connection has been completed.

Referring to FIG. 6, a convex and concave portion 23 consisting of alternate convexities and concavities is formed around the aperture 10 on one face of the connector 6" in the form of a petal. The convex and concave portion 23 includes a plurality of equally spaced recess portions 24 of narrow width whole depth is gradually increased toward the peripheral edge of the aperture 10. Therefore, the remaining portions 25 existing between these recess portions 24 act, as it were, as convexities although they are flush with the surface of the connector 6". Thus, when a welding torch of the kind described is disposed opposite to the end portion of the columnar projection 9 of the other connector 5 and an arc is produced thereacross, the plasmatic arc fluidizes the end portion of the projection 9 and the remaining portions 25 or convexities in the convex and concave portion 23, and the molten lead alloy of the connector 5 is mixed with the molten lead alloy of the connector 6", the molten metal mixture filling the gap between the columnar projection 9 and the aperture 10 in the connector 6" being then cooled down to establish a firm intercell connection as shown in FIG. 7.

Figure 8:
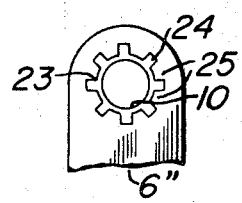
FIG. 8 is a front elevation illustrating the shape of the aperture and associated convexities and concavities in one of the connecting elements shown in FIG. 6.
Figure 9:
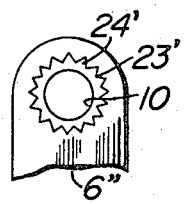
FIG. 9 is a front elevation illustrating a modification of the shape of the aperture and associated convexities and concavities in one of the connecting elements shown in FIG. 6.

FIG. 8 is a front elevation of the connector 6" shown in FIG. 6. The convex and concave portion 23 shown in FIG. 8 may be replaced by a convex and concave portion 23' as shown in FIG. 9 in which it will be seen that the convex and concave portion 23' includes a plurality of triangular recess portions 24'. In a further modification not shown, the inner wall of the aperture in one of the connectors may be formed with a plurality of alternate convexities and concavities which are readily fluidized when subjected to the heat applied by the torch so that they melt together with the end portion of the projection on the other connector to ensure a good bond between these two connectors.

The shape of one of the surfaces of the intercell connection obtained after welding depends upon the length of the columnar projection on one of the connectors. When the end of the columnar projection on one of the connectors is flush with the rear face of the other connector before welding as shown in FIG. 6, that surface of the connection is substantially flat as shown in FIG. 7 although it is not completely flat in a strict sense.

The method of making an intercell connection according to the present invention is advantageous in that heat can be concentrated on the end portion of the columnar projection formed integrally with one of the connectors and on the aperture portion of the other connector. Thus, the partition wall and the pressure applying means for applying pressure to these connectors are not substantially adversely affected by the heat applied during the welding. Further, the connectors are not heated to any appreciable degree due to the fact that the heat is applied only locally for a very short length of time. Thus, the battery can be conveyed to another step, for example, the step of placing a cover on the battery casing immediately after the welding step has been completed. Furthermore, due to the fact that any force tending to expand the opening itself of the partition wall is not applied although pressure is applied to the opposite faces of the partition wall, the intercell connection is entirely free from any reduction in the liquid and gas tightness due to undesirable enlargement of the diameter of the opening in the partition wall. Moreover, the weld can be satisfactorily prevented from undesirable oxidation as it is shielded by the stream of inert gas.

While a few embodiments and modifications thereof have been described by way of example, the present invention is in no way limited to such embodiments and modifications, and various other changes and modifications may be made therein without departing from the spirit of the present invention.

What we claim is:

1. A method of making intercell connection in a storage battery comprising arranging a pair of connectors integral with respective conductive straps of battery cell element assemblies on opposite sides of a battery partition wall having an opening, providing a connecting projection on one of said connectors so that it can extend through said opening in said partition wall into an aperture in the other said connector, pressing said connectors against said partition wall by a pair of pressure applying means while inserting said projection through said opening in said partition wall into said aperture in the other said connector, and welding the surface portion of said inserted projection to the inner wall of said aperture of the other connector by an arc substantially surrounded, cooled and concentrated by an injected inert gas on one side of said partition wall thereby connecting said connectors with each other.

2. A method of making an intercell connection as claimed in claim 1, in which said connectors are welded together by plasma welding.

3. A method of making an intercell connection in a storage battery comprising arranging a pair of connectors integral with respective conductive straps of battery cell element assemblies on opposite sides of a battery partition wall having an opening, providing a columnar connecting projection on one of said connectors at the face opposite to said partition wall so that it can extend through said opening in said partition wall into an aperture in the other said connector, bringing said connectors into intimate contact with said partition wall by pressing said connectors against said partition wall by a pair of pressure applying means so as to maintain the engagement between said projection and said aperture, and heating the engaging portions of said projection and said aperture with a plasmatic arc shielded by an inert gas thereby welding said projection to the inner wall portion of said aperture.

4. A method of making an intercell connection as claimed in Claim 3, in which at least one of said connectors is provided with an annular projection having an inner diameter larger than the diameter of said opening in said partition wall at the face opposite to said partition wall, and said annular projection is forced into said partition wall by the pressure applied to said connector by said pressure applying means.

5. A method of making an intercell connection as claimed in Claim 3, in which a plurality of alternate convexities and concavities are formed in the peripheral wall of said aperture in the other said connector which receives therein said connecting projection extending through said opening in said partition wall so that such convexities and concavities are readily fluidized by the heat of the arc thereby connecting the end portion of said connecting projection on one of said connectors with the inner wall portion of said aperture in the other said connector.

6. A method of making an intercell connection as claimed in claim 3, in which a sealing packing is interposed between said partition wall and one of said connectors having said connecting projection extending through said opening in said partition wall, and said connecting projection is welded to the inner wall portion of said aperture in the other said connector while maintaining said packing compressed by the pressure applied by said pressure applying means.

7. A method of making an intercell connection as claimed in claim 3, in which a pair of sealing packings is interposed between said partition wall and each of said connectors, and said connecting projection is welded to the inner wall portion of said aperture in the other said connector while maintaining said packings compressed by the pressure applied by said pressure applying means.

* * * * *